United States Patent

Pausch et al.

[11] Patent Number: 6,027,665
[45] Date of Patent: *Feb. 22, 2000

[54] ELECTRO-OPTICAL LIQUID-CRYSTAL DISPLAY

[75] Inventors: Axel Pausch; Kazuaki Tarumi, both of Seeheim; Volker Reiffenrath, Rossdorf, all of Germany

[73] Assignee: Merck Patent Gesellschaft mit beschrankter Haftung, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/913,307

[22] PCT Filed: Mar. 2, 1996

[86] PCT No.: PCT/EP96/00887

§ 371 Date: Sep. 12, 1997

§ 102(e) Date: Sep. 12, 1997

[87] PCT Pub. No.: WO96/28521

PCT Pub. Date: Sep. 19, 1996

[30] Foreign Application Priority Data

Mar. 15, 1995 [DE] Germany ............... 195 09 410

[51] Int. Cl.⁷ .................. C09K 19/52; C09K 19/34; G02F 1/1333
[52] U.S. Cl. ................. 252/299.61; 252/299.01; 252/299.63; 252/299.66; 252/299.67; 349/132
[58] Field of Search ............ 252/299.01, 299.61, 252/299.62, 299.63, 299.66, 299.67; 349/124, 132

[56] References Cited

U.S. PATENT DOCUMENTS 5,279,764  1/1994  Reiffenrath et al. .............. 252/299.66

FOREIGN PATENT DOCUMENTS

| | | |
|---|---|---|
| 450368 | 10/1991 | European Pat. Off. . |
| 474062 | 3/1992 | European Pat. Off. . |
| 667555 | 8/1995 | European Pat. Off. . |
| 673986 | 9/1995 | European Pat. Off. . |
| 7-181439 | 7/1995 | Japan . |
| 8802130 | 3/1988 | WIPO . |

*Primary Examiner*—Shean C. Wu
*Attorney, Agent, or Firm*—Millen, White, Zelano & Branigan, P.C.

[57] ABSTRACT

The invention relates to an electro-optical liquid-crystal display having a realignment layer for realigning the liquid crystals, where the field thereof has a significant component parallel to the liquid-crystal layer, comprising a liquid-crystalline medium having negative dielectric anisotropy, where the medium comprises at least one mesogenic compound which contains a group of the formula A

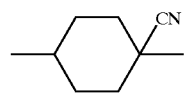

(A)

and at least one compound which contains a group of the formula B

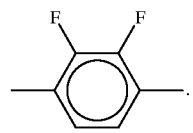

(B)

19 Claims, No Drawings

ELECTRO-OPTICAL LIQUID-CRYSTAL DISPLAY

This application is a 371 of PCT/EP 96/00887 filed Mar. 2, 1996.

The invention relates to an electro-optical liquid-crystal display having a realignment layer for realigning the liquid crystals, where the field thereof has a significant component parallel to the liquid-crystal layer, comprising a liquid-crystalline medium having negative dielectric anisotropy, where the medium comprises at least one mesogenic compound which contains a group of the formula A

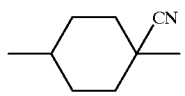

(A)

and at least one compound which contains a group of the formula B

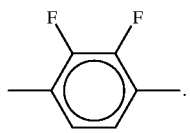

(B)

In conventional liquid-crystal displays (TN, STN, OMI and AMD-TN), the electric fields for realignment are produced essentially perpendicular to the liquid-crystal layer.

International Patent Application WO 91/10936 discloses a liquid-crystal display in which the electric signals are produced in such a way that the electric fields have a significant component parallel to the liquid-crystal layer (IPS, in-plane switching). The principles of operating such a display are described, for example, by R. A. Soref in Journal of Applied Physics, Vol. 45, No. 12, pp. 5466–5468 (1974).

EP 0 588 568 discloses various ways of addressing such a display.

These IPS displays can be operated with liquid-crystalline materials either having a positive dielectric anisotropy or having a negative dielectric anisotropy ($\Delta\epsilon \neq 0$). The specification describes, inter alia, an IPS display containing the mixture ZLI-2806 (E. Merck, Darmstadt) having negative dielectric anisotropy.

This mixture is based on compounds which contain a structural unit of the formula A. However, IPS displays containing this material have relatively high threshold voltages and long response times. The object was therefore to indicate liquid-crystalline materials which are suitable for achieving relatively low threshold voltages and short response times in IPS displays.

Surprisingly, this object has been achieved by using liquid-crystalline materials which comprise at least one compound which contains a group of the formula A

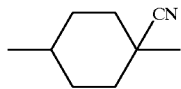

(A)

and at least one compound which contains a group of the formula B

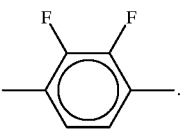

(B)

Such compounds are disclosed, for example, in EP 0 107 759 (formula A) and EP 0 332 007 (formula B).

However, these specifications give no indication that these substances can be used to improve the threshold voltages and the response times of IPS displays.

The invention thus relates to an electro-optical liquid-crystal display having a realignment layer for realigning the liquid crystals, where the field thereof has a significant component parallel to the liquid-crystal layer, comprising a liquid-crystalline medium having negative dielectric anisotropy, where the medium comprises at least one mesogenic compound which contains a group of the formula A

(A)

and at least one compound which contains a group of the formula B

(B)

a) Preferred embodiments are IPS displays in which the medium comprises at least one compound of the formula I

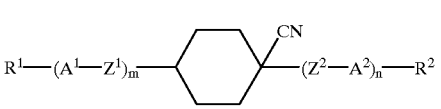

(I)

and at least one compound of the formula II

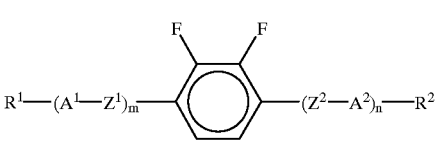

(II)

in each of which $R^1$ and $R^2$ are each an alkyl or alkenyl radical having 1 to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

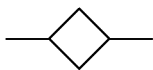

—CO—, —CO—O—, —O—CO— or —O—CO—O— in such a way that O atoms are not linked directly to one another, $A^1$ and $A^2$ are each, independently of one another,
(a) a trans-1,4-cyclohexylene radical in which, in addition, one or more non-adjacent $CH_2$ groups may be replaced by —O— and/or —S—,
(b) a 1,4-phenylene radical in which, in addition, one or two CH groups may be replaced by N,
(c) a radical from the group consisting of 1,4-cyclohexenylene, 1,4-bi-cyclo[2.2.2]octylene, piperidine-1,4-diyl, naphthalene-2,6-diyl, decahydronaphthalene-2,6-diyl and 1,2,3,4-tetrahydronaphthalene-2,6,diyl, where the radicals (a) and (b) may be substituted by one or two fluorine atoms, $Z^1$ and $Z^2$ are each, independently of one another, —CO—O—, —O—CO—, —CH$_2$O—, —OCH$_2$—, —CH$_2$CH$_2$—, —CH=CH—, —C≡Cφ— or a single bond, or one of the radicals $Z^1$ and $Z^2$ is alternatively —(CH$_2$)$_4$— or —CH=CH—CH$_2$CH$_2$—, m and n are 0, 1 or 2 and
m+n is 1, 2 or 3;
b) the medium has a dielectric anisotropy Δε of <−4.6, preferably between −4.7 and −8;
c) the medium comprises at least one compound of the formula III

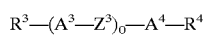

in which
$R^3$ and $R^4$ each, independently of one another, are as defined for $R^1$,
$A^3$ and $A^4$ each, independently of one another, are as defined for $A^1$ and $A^2$,
$Z^3$, in each case independently of the others, is as defined for $Z^1$ and $Z^2$ and,
o is 1, 2 or 3.

Preference is even more given to an IPS display in which the pixels are addressed by means of an active matrix.

The invention furthermore relates to a liquid-crystalline medium having negative dielectric anisotropy which comprises at least one compound of the formula I and at least one compound of the formula II, in particular which comprises from 15 to 65% by weight, preferably from 20 to 60% by weight, of at least one compound of the formula I, from 15 to 45% by weight, preferably from 20 to 40% by weight, of at least one compound of the formula II, and from 10 to 55% by weight, preferably from 10 to 50% by weight, of at least one compound of the formula III.

The novel liquid-crystalline medium preferably comprises at least one compound of the formula Ia

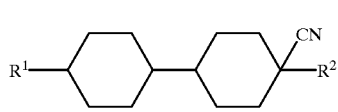

at least one compound of the formula IIa

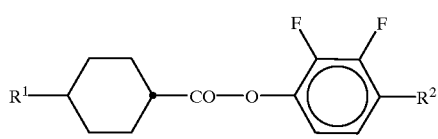

at least one compound selected from the formulae IIIa, IIIb and IIIc

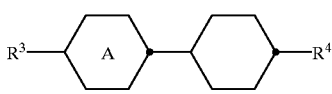

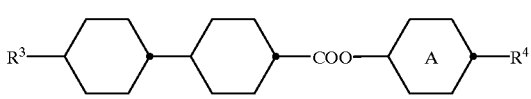

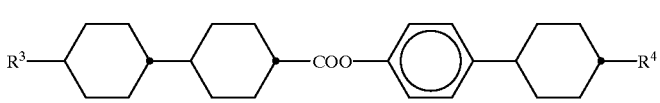

in which

is in each case

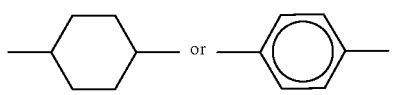

and $R^1$, $R^2$, $R^3$ and $R^4$ and $L^4$ are in each case as defined above.

The novel liquid-crystalline media generally have a birefrigence ($\Delta n$) of <0.10, preferably between 0.04 and 0.09, in particular between 0.05 and 0.07.

The flow viscosity (at 20° C.) of the novel materials is generally less than 30 mm$^2$ s$^{-1}$, in particular between 15 and 25 mm$^2$ s$^{-1}$. The resistivity of the novel materials is generally between $5 \times 10^{10}$ and $5 \times 10^{13}$ $\Omega \cdot$cm at 20° C.

It has been found that even a relatively small proportion of compounds of the formula I mixed with conventional liquid-crystal materials, but in particular with one or more compounds of the formula II and/or III, results in a significant reduction in the threshold voltage and in fast response times, and at the same time broad nematic phases having low smectic-nematic transition temperatures are observed. The compounds of the formulae I to III are colorless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups containing terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2O_m)$, in which n and m are each, independently of one another, from 1 to 6. n is preferably 1 and m is preferably from 1 to 6.

Through a suitable choice of the meanings of $R^1$ and $R^5$, the addressing times, the threshold voltage, the steepness of the transmission characteristic lines, etc., can be modified as desired. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals.

4-alkenyl radicals, 3-alkenyl radicals and the like generally give lower threshold voltages and smaller values of $k_{33}/k_1 l$ compared with alkyl and alkoxy radicals.

The optimum mixing ratio between the compounds of the formulae I and II+III depends substantially on the desired properties, on the choice of the components of the formulae I, II and/or III and on the choice of further optional components. Suitable mixing ratios within the above range can easily be determined from case to case.

The total amount of compounds of the formulae I to III in the novel mixtures is not crucial. The mixtures can therefore contain one or more further components in order to optimize the various properties. However, the observed effect on the addressing times and on the threshold voltage is generally greater the higher the total concentration of compounds of the formulae I and II.

The liquid-crystalline media according to the invention preferably contain 2 to 40, in particular 4 to 30, components as further constituents besides one or more compounds of the formulae I, II and III. These media very particularly preferably contain 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes optionally halogenated stilbenes, benzyl phenyl ethers, tolans and substituted cinnamic acids. The 1,4-phenylene groups in these compounds may also be fluorinated.

The most important compounds suitable as further constituents of media according to the invention can be characterized by the formulae 1, 2, 3, 4 and 5:

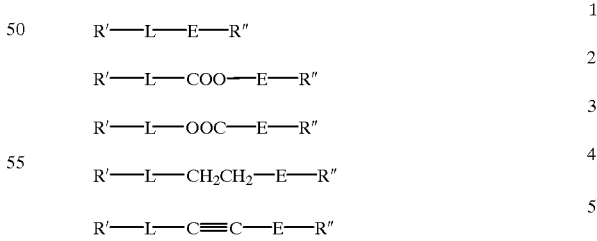

In the formulae 1, 2, 3, 4 and 5, L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl, Dio is 1,3-dioxane- 2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The media according to the invention preferably contain one or more components selected from the compounds of the formulae 1, 2, 3, 4 and 5 in which L and E are selected from the group comprising Cyc, Phe and Pyr and simultaneously one or more components selected from the compounds of the formulae 1, 2, 3, 4 and 5 in which one of the radicals L and E is selected from the group comprising Cyc, Phe and Pyr and the other radical is selected from the group comprising -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group comprising -Phe-Cyc-, -Cyc-Cyc-, -G-Phe- and -G-Cyc-.

In a smaller sub-group of the compounds of the formulae 1, 2, 3, 4 and 5, R' and R" are in each case, independently of one another, alkyl, alkenyl, alkoxy, alkoxyalkyl, alkenyloxy or alkanoyloxy having up to 8 carbon atoms. This smaller sub-group is called group A below, and the compounds are labelled with the subformulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5 which is known as group B, r" is —F, —Cl, —NCS or —(O)$_i$CH$_{3-(k+1)}$F$_k$Cl$_1$, where i is 0 or 1, and k+1 is 1, 2 or 3; the compounds in which R" has this meaning are labelled with the sub-formulae 1b, 2b, 3b, 4b and 5b. Particular preference is given to those compounds of the sub-formulae 1b, 2b, 3b, 4b and 5b in which R" is —F, —Cl, —NCS, —CF$_3$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is known as group C below, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

In addition to the preferred compounds of groups A, B and C, other compounds of the formulae 1, 2, 3, 4 and 5 having other variants of the proposed substituents are also customary. All these substances can be obtained by methods which are known from the literature or analogously thereto.

Besides compounds of the formula I according to the invention, the media according to the invention preferably contain one or more compounds selected from group A and/or group B and/or group C. The proportions by weight of the compounds from these groups in the media according to the invention are preferably Group A: 0 to 90%, preferably 20 to 90%, in particular 30 to 90%

Group B: 0 to 80%, preferably 10 to 80%, in particular 10 to 65%

Group C: 0 to 80%, preferably 5 to 80%, in particular 5 to 50%, the sum of the proportions by weight of the group A and/or B and/or C compounds present in the particular media according to the invention preferably being 5% to 90% and in particular 10% to 90%.

The media according to the invention preferably comprise 1 to 40%, particularly preferably 5 to 30%, of compounds according to the invention. Further preferred media are those which comprise more than 40%, in particular 45 to 90%, of compounds according to the invention. The media preferably comprise three, four or five compounds according to the invention.

The structure of the novel IPS display corresponds to the construction which is conventional for such displays, as described, for example, in WO 91/10936 or EP 0 588 568. The term conventional construction here is broadly drawn and also covers all derivatives and modifications of the IBS display, in particular, for example, also matrix display elements based on poly-Si TFT or MIM.

However, an essential difference between the novel displays and the conventional ones is in the choice of the liquid-crystal parameters of the liquid-crystal layer.

The liquid-crystal mixtures which can be used in accordance with the invention are prepared in a manner which is conventional per se. In general, the desired amount of the components used in the lesser amount is dissolved in the components making up the principal constituent, expediently at elevated temperature. It is also possible to mix solutions of the components in an organic solvent, for example in acetone, chloroform or methanol, and, after thorough mixing, to remove the solvent again, for example by distillation.

The dielectrics may also contain further additives known to the person skilled in the art and described in the literature. For example, 0–15% of pleochroic dyes or chiral dopes can be added.

C denotes a crystalline phase, S denotes a smectic phase, S$_B$ denotes a smectic B phase, N denotes a nematic phase and I denotes the isotropic phase.

V$_{10}$ denotes the voltage for 10% transmission (viewing direction perpendicular to the plate surface). t$_{on}$ denotes the switch-on time and toff denotes the switch-off time at an operating voltage corresponding to 2.5 times the value of V$_{10}$. An denotes the optical anisotropy and n$_0$ denotes the refractive index (in each case 589 nm). Δε denotes the dielectric anisotropy (Δε=ε$_∥$–ε$_⊥$, where ε$_∥$ denotes the dielectric constant parallel to the long axes of the molecules and ε$_⊥$ denotes the dielectric constant perpendicular thereto). The electro-optical data were measured in an IPS cell at 20° C., unless expressly stated otherwise. The optical data were measured at 20° C. unless expressly stated otherwise.

An IPS test cell as described in WO 91/10936 having a comb structure was used, where the electrodes and the electrode spacings each were 20 μm apart.

The layer thickness d of the liquid-crystal material is 5 μm. The cell furthermore has:

Initial twist angle: 0°

Alignment angle: 5°

Tilt angle 3°

The cells are dark in the "off" state.

In the present application and in the examples below, the structures of the liquid-crystal compounds are indicated by acronyms, the transformation into chemical formulae taking place as in Tables A and B below. All the radicals C$_n$H$_{2n+1}$ are straight-chain alkyl radicals containing n and/or m carbon atoms. The coding in Table B requires no further explanation. In Table A, only the acronym for the parent structure is given. In individual cases, a code follows for the substituents R$^1$, R$^2$, L$^1$, L$^2$ and L$^3$, separated from the acronym for the parent structure by a hyphen:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | F | H | H |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | F | H | H |
| nCF$_3$ | $C_nH_{2n+1}$ | $CF_3$ | H | H | H |
| nOCF$_3$ | $C_nH_{2n+1}$ | $OCF_3$ | H | H | H |
| nOCF$_3$ | $C_nH_{2n+1}$ | $OCF_3$ | H | H | H |
| nOCF$_2$ | $C_nH_{2n+1}$ | $OCHF_2$ | H | H | H |
| nS | $C_nH_{2n+1}$ | NCS | H | H | H |
| rVsN | $C_rH_{2r+1}-CH=CH-C_sH_{2s}-$ | CN | H | H | H |
| rEsN | $C_rH_{2r+1}-O-C_2H_{2s}-$ | CN | H | H | H |
| nAm | $C_nH_{2n+1}$ | $COOC_mH_{2m+1}$ | H | H | H |
| nF.F.F | $C_nH_{2n+1}$ | F | F | F | H |
| nCl.F.F | $C_nH_{2n+1}$ | Cl | F | F | H |
| nCF$_3$.F.F | $C_nH_{2n+1}$ | $CF_3$ | F | F | H |
| nOCF$_3$.F.F | $C_nH_{2n+1}$ | $OCF_3$ | F | F | H |
| nOCF$_2$.F.F | $C_nH_{2n+1}$ | $OCHF_2$ | F | F | H |
| nOCF$_3$.F | $C_nH_{2n+1}$ | $OCF_3$ | F | H | H |
| nmFF | $C_nH_{2n+1}$ | $C_mH_{2m+1}$ | F | H | F |
| nOmFF | $C_nH_{2n+1}$ | $C_mH_{2m+1}$ | F | H | F |

TABLE A

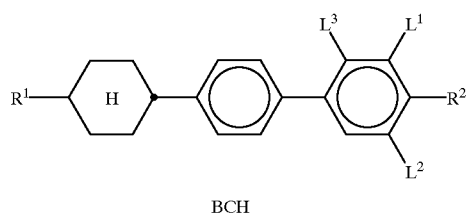

BCH

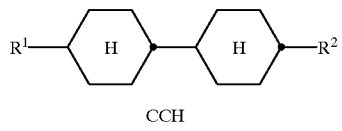

CCH

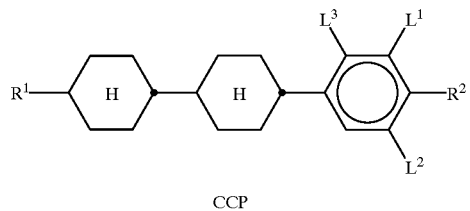

CCP

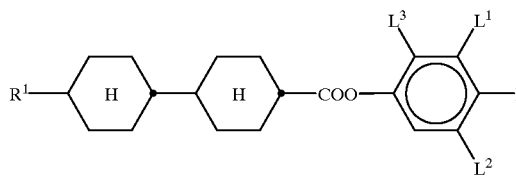

CP

TABLE A-continued

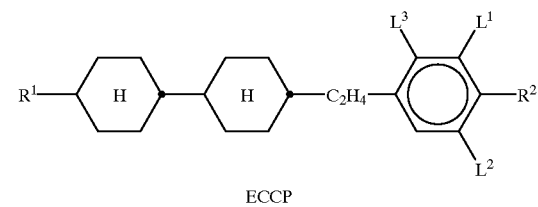

ECCP

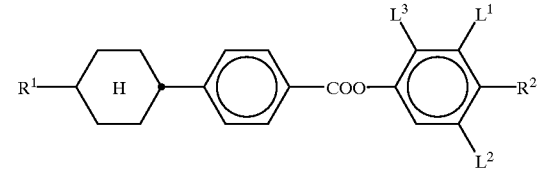

HP

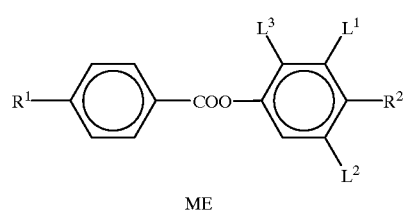

ME

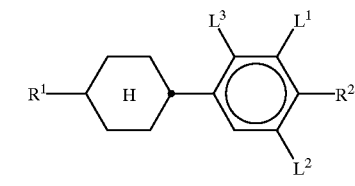

PCH

TABLE A-continued

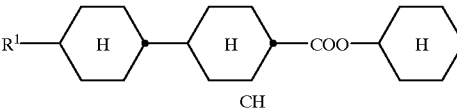

TABLE B

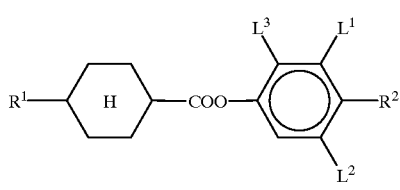

EXAMPLE 1

An IPS display contains a nematic mixture having

| clearing point | +72° C. |
|---|---|
| $\Delta n$ | 0.0533 |
| $n_o$ | 1.4700 |
| $\Delta\epsilon$ | −7.3 |
| $\epsilon_i$ | 11.7 |
| viscosity (20° C.) | 54 mm$^2$ s$^{-1}$ | and comprising

| CCN-33 | 18.00 |
|---|---|
| CCN-47 | 18.00 |
| CCN-55 | 18.00 |
| D-302FF | 11.00 |
| D-402FF | 11.00 |
| D-502FF | 10.00 |
| CH-43 | 3.00 |
| CCH-34 | 4.00 |
| CCPC-33 | 4.00 |
| CCPC-34 | 3.00 | and has high contrast and short response times.

EXAMPLE 2

An IPS display contains a nematic mixture having

| clearing point | +75° C. |
|---|---|
| $\Delta n$ | 0.0565 |
| $n_o$ | 1.5238 |
| $\Delta\epsilon$ | −4.5 | and comprising

| CCN-33 | 7.00 |
|---|---|
| CCN-55 | 10.00 |
| D-302FF | 10.00 |
| D-402FF | 8.00 |
| D-502FF | 15.00 |
| CH-33 | 5.00 |
| CH-35 | 5.00 |
| CH-43 | 5.00 |
| CCH-34 | 24.00 |
| CCH-301 | 4.00 |
| CCH-303 | 7.00 | and has high contrast and short response times.

EXAMPLE 3

An IPS display contains a nematic mixture having

| clearing point | +78° C. |
|---|---|
| $\Delta n$ | 0.0539 |
| $n_o$ | 1.5217 |
| $\Delta\epsilon$ | −5.0 | and comprising

| CCN-47 | 14.00 |
|---|---|
| CCN-55 | 10.00 |
| D-302FF | 4.00 |
| D-402FF | 10.00 |
| D-502FF | 14.00 |
| CH-35 | 10.00 |
| CH-45 | 5.00 |
| CCH-34 | 26.00 |
| CCH-301 | 4.00 |
| CCH-303 | 3.00 | and has high contrast and short response times.

EXAMPLE 4

An IPS display contains a nematic mixture having

| clearing point | +79° C. |
|---|---|
| $\Delta n$ | 0.0525 |
| $n_o$ | −4.7 |
| viscosity (20° C.) | 30 mm$^2 \cdot$ s$^{-1}$ | and comprising

| | |
|---|---|
| CCN-33 | 13.00 |
| CCN-47 | 10.00 |
| CCN-55 | 10.00 |
| D-302FF | 7.00 |
| D-402FF | 10.00 |
| D-502FF | 10.00 |
| CH-35 | 9.00 |
| CH-45 | 9.00 |
| CCH-34 | 22.00 | and has high contrast and short response times.

COMPARATIVE EXAMPLE

An IPS display contains the nematic mixture ZLI-2806 having

| | |
|---|---|
| clearing point | +100° C. |
| Δn | 0.0437 |
| Δε | −4.8 |
| viscosity (20° C.) | 57 mm² · s⁻¹ | and comprising

| | |
|---|---|
| CCN-47 | 20.00 |
| CCN-55 | 21.00 |
| CCH-301 | 14.00 |
| CCH-302 | 10.00 |
| CH-33 | 4.00 |
| CH-35 | 4.00 |
| CH-43 | 4.00 |
| CH-45 | 4.00 |
| BCN-55 | 22.00 | and has a longer response time than the display of Example 4 and a higher threshold voltage than the display of Example 1.

We claim:

1. An electro-optical liquid-crystal display comprising:

a realignment layer for realigning liquid crystals and a liquid-crystal layer, where the field of the realignment layer has a significant component parallel to the liquid-crystal layer, and the liquid-crystal layer comprises a liquid-crystalline medium having negative dielectric anisotropy and a birefringence of less than 0.10, where the liquid-crystalline medium comprises at least one mesogenic compound of the formula (I)

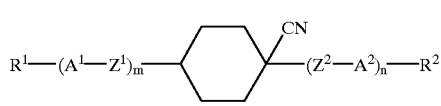

(I)

and at least one compound of the formulula (II)

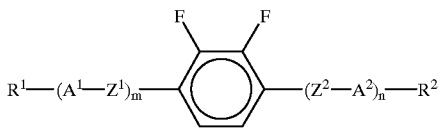

(II)

wherein in each formula $R^1$ and $R^2$ are independently each an alkyl or alkenyl radical having 1 to 15 carbon atoms which is unsubstituted, monosubstituted by CN or $CF_3$ or mono-substituted to perhalo-substituted by halogen, where, in addition, one or more $CH_2$ groups in these radicals are optionally, independently of one another, replaced by —O—, —S—,

—CO—, —CO—O—, —O—CO— or —O—CO—O— in such a way that O atoms are not linked directly to one another, $A^1$ and $A^2$ are each, independently of one another, (a) a trans-1,4-cyclohexylene radical in which, in addition, one or more non-adjacent $CH_2$ groups are optionally replaced by —O— and/or —S—, (b) a 1,4-phenylene radical in which, in addition, one or two CH groups are optionally replaced by N, (c) a radical selected from the group consisting of 1,4-cyclohexenylene, 1,4-bicyclo-[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals for (a) and (b) are optionally substituted by one or two fluorine atoms, $Z^1$ and $Z^2$ are each, independently of one another, —CO—O—, —O—CO—, —$CH_2$O—, —O$CH_2$—, —$CH_2CH_2$—, —CH=CH—, —C≡C— or a single bond, or one of the radicals $Z^1$ and $Z^2$ is alternatively —$(CH_2)_4$— or —CH=CH—$CH_2CH_2$—, m and n are 0, 1 or 2 and m+n is 1, 2 or 3.

2. The liquid-crystal display of claim 1, wherein the liquid-crystalline medium has a birefringence of from 0.04 to 0.09.

3. The liquid-crystal display of claim 1, wherein the liquid-crystalline medium has a birefringence of from 0.05 to 0.07.

4. A liquid-crystal display according to claim 1, wherein the liquid-crystalline medium has a dielectric anisotropy, Δε, of ≦−4.5.

5. The liquid-crystal display of claim 2, wherein the liquid-crystalline medium has a dielectric anisotropy, Δε, of from −4.5 to −8.0.

6. The liquid-crystal display of claim 2, wherein the liquid-crystalline medium has a dielectric anisotropy, Δε, of from −4.7 to −8.0.

7. The liquid-crystal display according to claim 1, wherein the liquid-crystalline medium further comprises at least one compound of the formula III $R^3(A^3—Z^3)_o—A^4—R^4$      III in which
- $R^3$ and $R^4$ each, independently of one another, are as defined for $R^1$,
- $A^3$ and $A^4$ each, independently of one another, are as defined from $A^1$ and $A^2$,
- $Z^3$ in each case, independently of the others, is as defined for $Z^1$ and $Z^2$, and
- o is 1, 2 or 3.

8. A liquid-crystal display according to claim 1 which has pixels addressed by means of an active matrix.

9. A liquid-crystalline medium having negative dielectric anisotropy, $\Delta\epsilon$, $\leq -4.5$ and a birefringence of less than 0.10, which comprises at least one compound of the formula

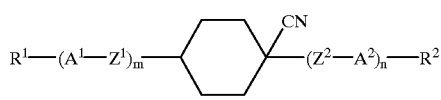 (I)

and at least one compound of the formula II

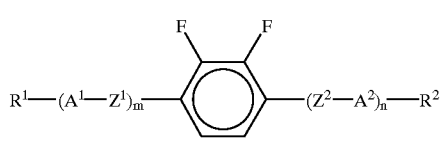 (II)

wherein in each formula
- $R^1$ and $R^2$ are independently each an alkyl or alkenyl radical having 1 to 15 carbon atoms which is unsubstituted, monosubstituted by CN or $CF_3$ or monosubstituted to perhalo-substituted by halogen, where, in addition, one or more $CH_2$ groups in these radicals are optionally, independently of one another, replaced by —O—, —S—,

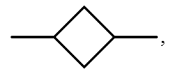

—CO—, —CO—O—, —O—CO— or —O—CO—O— in such a way that O atoms are not linked directly to one another,
- $A^1$ and $A^2$ are each, independently of one another,
  (a) a trans-1,4-cyclohexylene radical in which, in addition, one or more non-adjacent $CH_2$ groups are optionally replaced by —O— and/or —S—,
  (b) a 1,4-phenylene radical in which, in addition, one or two CH groups are optionally replaced by N,
  (c) a radical selected from the group consisting of 1,4-cyclohexenylene, 1,4-bicyclo-[2.2.2]octylene, piperidine-1,4-diyl, naphthalene-2,6-diyl, decahydronaphthalene-2,6-diyl and 1,2,3,4-tetrahydronaphthalene-2,6-diyl,
where the radicals for (a) and (b) are optionally substituted by one or two fluorine atoms,
- $Z^1$ and $Z^2$ are each, independently of one another, —CO—O—, —O—CO—, —CH$_2$O—, —OCH$_2$—, —CH$_2$CH$_2$—, —CH=CH—, —C≡C— or a single bond, or one of the radicals $Z^1$ and $Z^2$ is alternatively —(CH$_2$)$_4$— or —CH=CH—CH$_2$CH$_2$—,
- m and n are 0, 1 or 2 and m+n is 1, 2 or 3.

10. A liquid-crystalline medium according to claim 9, which further comprises at least one compound of the formula III

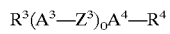 III in which
- $R^3$ and $R^4$ each, independently of one another, are as defined for $R^1$,
- $A^3$ and $A^4$ each, independently of one another, are as defined for $A^1$ and $A^2$,
- $Z^3$ in each case, independently of the others, is as defined for $Z^1$ and $Z^2$, and
- o is 1, 2 or 3.

11. A liquid-crystalline medium according to claim 10, which comprises
- from 15 to 65% by weight of at least one compound of the formula I,
- from 15 to 45% by weight of at least one compound of the formula II, and
- from 10 to 55% by weight of at least one compound of the formula III.

12. A liquid-crystalline medium according to claim 10, which comprises
- from 20 to 60% by weight of at least one compound of the formula I,
- from 20 to 60% by weight of at least one compound of the formula II, and
- from 10 to 50% by weight of at least one compound of the formula III.

13. A liquid-crystalline medium according to claim 10, which comprises
at least one compound of the formula Ia

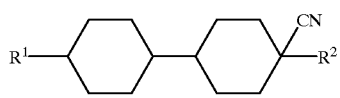 Ia at least one compound of the formula IIa,

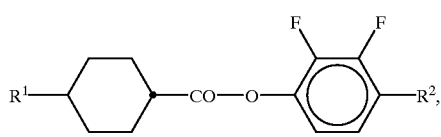 IIa and
at least one compound selected from those of the formulae IIIa, IIIb and IIIc

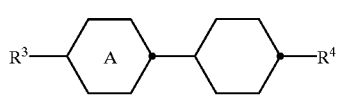 IIIa

-continued

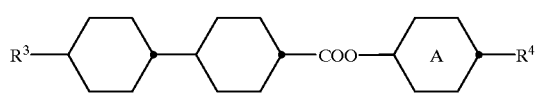
IIIb

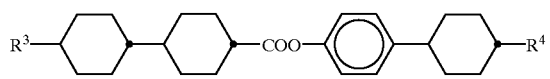
IIIc in which

is in each case

or

and $R^1$, $R^2$, $R^3$ and $R^4$ are each as defined above.

14. The liquid-crystalline medium of claim 9, wherein the liquid-crystalline medium has a birefringence of from 0.04 to 0.09.

15. The liquid-crystalline medium of claim 9, wherein the liquid-crystalline medium has a birefringence of from 0.05 to 0.07.

16. The liquid-crystalline medium of claim 9, wherein the liquid-crystalline medium has a dielectric anisotropy, $\Delta\epsilon$, of from −4.5 to −8.0.

17. The liquid-crystalline medium of claim 14, wherein the liquid-crystalline medium has a dielectric anisotropy, $\Delta\epsilon$, of from −4.5 to −8.0.

18. The liquid-crystalline medium of claim 9, wherein the liquid-crystalline medium has a dielectric anisotropy, $\Delta\epsilon$, of from −4.7 to −8.0.

19. The liquid-crystalline medium of claim 14, wherein the liquid-crystalline medium has a dielectric anisotropy, $\Delta\epsilon$, of from −4.7 to −8.0.

* * * * *